United States Patent [19]

Osthus et al.

[11] Patent Number: 5,233,534
[45] Date of Patent: Aug. 3, 1993

[54] PRODUCTION SYSTEM FOR GARMENTS OR OTHER PRODUCTS

[75] Inventors: Harold L. Osthus, West Willington, Conn.; Richard Howitt, Rochester, N.Y.; Vernon Beausoleil, Columbia, Conn.

[73] Assignee: Gerber Garment Technology, Inc., Tolland, Conn.

[21] Appl. No.: 705,074

[22] Filed: May 24, 1991

[51] Int. Cl.$^5$ .................... G06F 15/46; D05B 21/00
[52] U.S. Cl. .................... 364/468; 364/470; 112/121.12; 112/155; 198/340
[58] Field of Search .............. 364/468, 131, 138, 470, 364/474.11, 478; 198/340, 341; 112/121.12, 155, 262.3

[56] References Cited

U.S. PATENT DOCUMENTS

| | | | |
|---|---|---|---|
| 4,408,291 | 10/1983 | Gunzberg et al. | 364/470 |
| 4,509,123 | 4/1985 | Vereen | 364/470 |
| 4,635,574 | 1/1987 | Fujita et al. | 112/121.12 |
| 4,661,912 | 4/1987 | Imanishi | 364/468 |
| 4,700,633 | 10/1987 | Weiselfish et al. | 104/102 |
| 4,756,261 | 7/1988 | Gershoni | 112/262.3 |
| 4,878,176 | 10/1989 | Teranishi et al. | 364/468 |
| 4,947,758 | 8/1990 | Kuchta | 104/172.5 |
| 5,003,897 | 4/1991 | Yokoe et al. | 112/121.12 |

FOREIGN PATENT DOCUMENTS 0344400 12/1989 European Pat. Off. .

OTHER PUBLICATIONS

Article from Bobbin Magazine, Sep. 1984, entitled "Sewing Room Automation".
Brochure entitled, "GERBERmover-Impact Standard Data System", Dec. 1988.
Brochure entitled, "GERBERmover-GM-200 Unit Production System", Sep. 1989.

Primary Examiner—Jerry Smith
Assistant Examiner—Paul Gordon
Attorney, Agent, or Firm—McCormick, Paulding & Huber

[57] ABSTRACT

A production system for garments or other products includes a plurality of work stations for performing a series of work operations in which parts of a garment or other product are progressively manufactured. A conveyorized transport system extends between the various work stations and the flow of work between the various stations is regulated by assigning class codes to each operation required for a garment and each operation available at the various work stations. The class codes for a given garment order are read sequentially from a data memory and as a requirement for each code or work operation arises in the course of producing the garment, the scheduler searches a second data memory to locate the work stations which offer the work operations corresponding to the class code sought. The scheduler then determines from among the available work stations the specific work station to which the garment pieces are sent for performing the required work operation.

21 Claims, 5 Drawing Sheets

PRODUCTION SYSTEM FOR GARMENTS OR OTHER PRODUCTS

BACKGROUND OF THE INVENTION

The present invention resides in a production system for garments or other products which are manufactured by mass production techniques. In particular, the present invention relates to apparatus and methods for controlling the work flow between multiple work stations where different work operations are performed to manufacture the product.

Mass production systems for products such as ladies dresses, men's shirts and suits and a wide variety of other products are well known in the art and have been used for several years to both control the flow of work between work stations in the manufacturing process and to keep track of completed work products, work in progress and labor and production costs. In the garment industry, the production systems generally include a plurality of work stations at which various types of equipment such as sewing machines, button holers and the like are operated by a skilled human operator, and a computer controlled conveyorized transport system for transporting garment parts or partially assembled garments from one station to another. Parts forming the garments are loaded the transport system, are moved from work station to work station where different work operations are carried out until a finished garment is produced, and then the garment is unloaded from the system for delivery to retail and other outlets for purchase by customers.

The series of work operations performed at the various work stations generally begins with the attachment of pre-cut garment parts or pieces to a carrier and the loading of the carrier and attached pieces onto the transport system that extends between the work stations. The transport system is controlled to deliver the carrier and garment pieces to a work station where the first in the series of work operations leading to complete manufacture of the garment takes place. The garment pieces and carrier are unloaded at the work station by a human operator who also performs the work operation on the garment pieces in conjunction with equipment at the work station. The first operation in a series may consist, for example, of sewing the first two garment pieces together on a sewing machine. The now-sewn pieces are then re-attached to the same or another carrier and are taken by the conveyor system to another work station where the next operation in the series is performed. The partially assembled garment is moved from station to station until the garment has been completely manufactured. The types of operations that are performed at each station for manufacturing a garment include sewing pieces together, hemming the work pieces, sewing linings into the work pieces, sewing cuffs to sleeves, sewing sleeves to the front and back panels, sewing pockets, installing buttons and button holes and numerous other operations in addition to inspections of the product at its various stages of manufacture.

The details of a conveyorized transport system of the type used in a garment manufacturing system is shown in U.S. Pat. No. 4,947,758 having the same Assignee as the present invention. The movement of garment pieces from station to station must be controlled, and an apparatus for tracking the movement of the garment pieces and partially assembled garments from station to station is disclosed in U.S. Pat. No. 4,700,633 also assigned to the Assignee of the present invention.

In any garment manufacturing facility, only one or a limited number of assembly areas or "sewing rooms" are available for manufacturing all types and styles of garments produced by the facility. Additionally, garments of different types and styles must be moved from station to station by the single transport conveyor system in accordance with the series of work operations that are peculiar to each of the garments. All garments do not go to all work stations in the progressive stages of assembly, and correspondingly, all work stations do not perform work operations on all of the garments processed through the production system. As a consequence, the production system in the sewing room must accommodate a wide variety of styles and sizes of garments at any given time.

Furthermore, the number of types and styles of garments that are in the system at any given time can readily exceed 20 or 30. Accordingly, the production systems of the prior art have employed computerized tracking systems not only for locating the garment parts and partially assembled garments at any point in time, but also for scheduling the movement of the partially assembled garments and parts from one work station to the next available work station having the capability of performing the next required work operation.

The trend in the garment industry has been to produce smaller quantities of garments of a given style and to offer a greater variety of styles to the customer. This trend is reflected in the increased number of styles or product that must be handled by the production system at any given time. As a consequence, a control system for handling a much higher quantity of data is needed. The higher quantity of data also introduces greater complexity in the programming of the control system to accommodate, for example, changes in the work assignments within the production system. For example, if a piece of equipment breaks down at a particular work station, the work operations normally scheduled for that work station must be shifted elsewhere. The burden of reprogramming the system to direct the goods to other stations suitable for each style of product increases in direct proportion to the number of styles involved.

It is, accordingly, a general object of the present invention to provide a production system which is designed to handle a large number of products of different types and styles and which is designed to more easily accommodate changes in the work station assignments in spite of the increased volume of data being handled.

SUMMARY OF THE INVENTION

The present invention resides in a production system for garments or other products that are manufactured in high volume. The system includes a plurality of work stations having equipment at each station for performing a series of work operations in which parts of a garment or other product are progressively manufactured. Each work station has equipment that is capable of performing at least one of the operations in the series, and may be capable of use in manufacturing more than one particular product. For example, in the garment industry the work station may include a sewing machine that is capable of sewing garment parts or pieces together for several styles of product.

Controlled transporting means are connected with the plurality of work stations for conveying the product in various states of manufacture from station to station. The transporting means is controlled so that the product is delivered to the appropriate stations for performing the series of work operations in sequence.

Computerized control means are connected in controlling relationship with the transporting means and include first memory means for storing a request or order for a product in terms of the series of work operations for a selected style of the product. Each work operation in a series is associated with a class code unique to the operation so that the specific operation can be recognized from the code.

Second memory means are provided in the production system for storing data defining the work operations that have been assigned to be performed at each of the various work stations in the system. The assigned operations at any given station are defined in terms of the same class codes that were used in the first memory means. In this manner a search of the second memory for a class code corresponding to a particular work operation that is required for a product reveals all the work stations that have been assigned to perform that operation. To this end the production system includes scheduling means for searching the class codes in the second memory means to identify those work stations that have been assigned to perform a given work operation in the series for a given product. With the work stations identified, the scheduling means then selects from the identified work stations, one work station for accomplishing the given work operation. The process continues in this manner until all of the work operations in the series have been performed at various stations and a garment or other product has been manufactured.

One primary advantage of the system that arises from the use of class codes is the ability to change the work operation assignments at the work stations without reprogramming all of the product orders which at present define the work operations as well as the work stations where those operations are performed. Larger numbers of styles of product and types of product may be loaded into the control system for simultaneous or sequential operation, and because of the use of class codes to identify the work operations, changes in the stations assigned to perform those operations can be easily and quickly accommodated by editing the information in the second memory means alone.

DETAILED DESCRIPTION OF THE PREFERRED EMBODIMENTS

Figure 1:
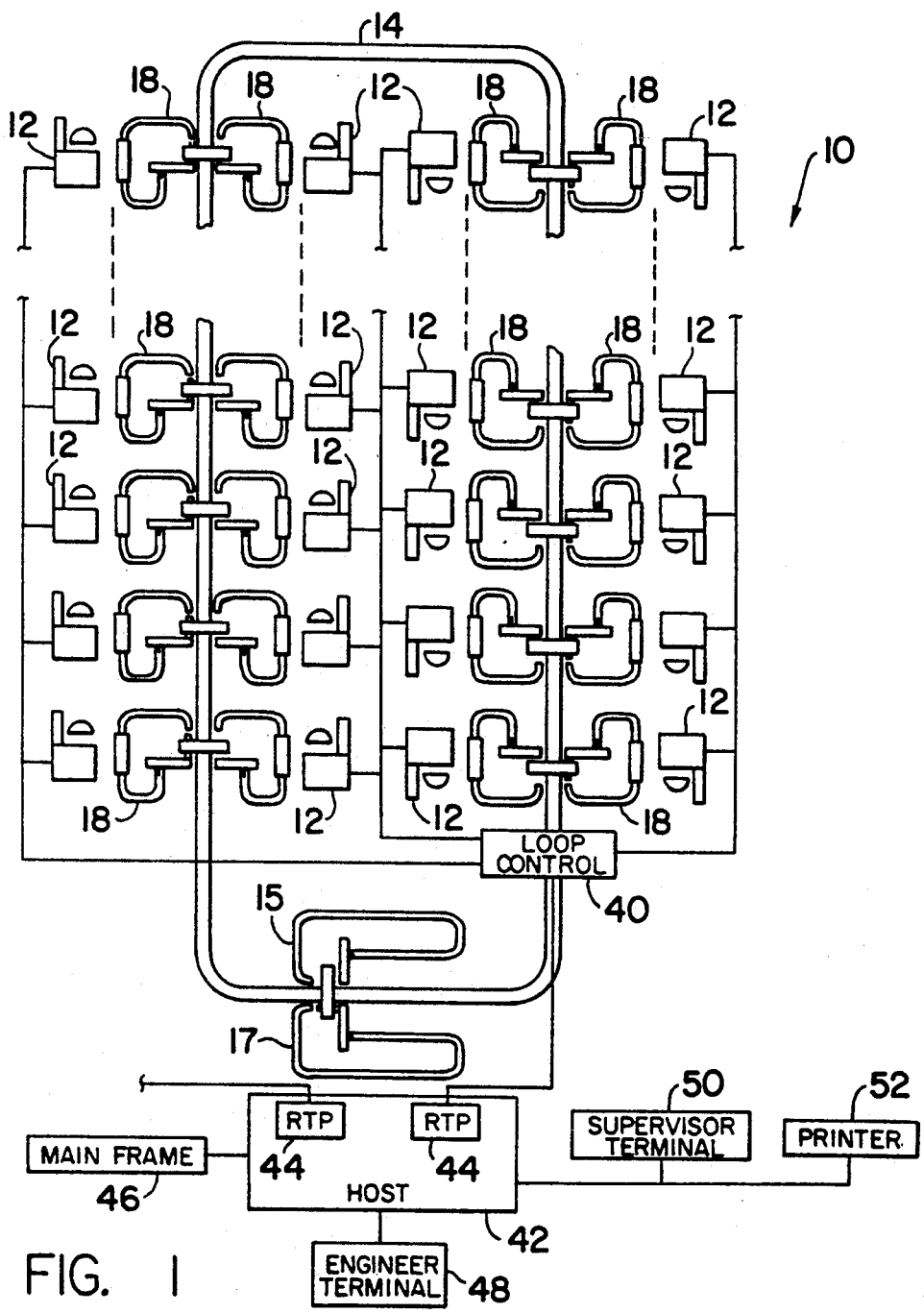
FIG. 1 is a schematic view of a production system and the associated controls in which the present invention is embodied.

FIG. 1 illustrates a production system, generally designated 10, in which the present invention is utilized to control the flow of work between a plurality of work stations 12 distributed along each side of an oblong main rail and propulsion track 14 of a conveyorized transport system. The rail and propulsion track form the main loop for transporting products in partially assembled forms, such as partially assembled garments, between the various work stations in a manufacturing facility.

Figure 2:
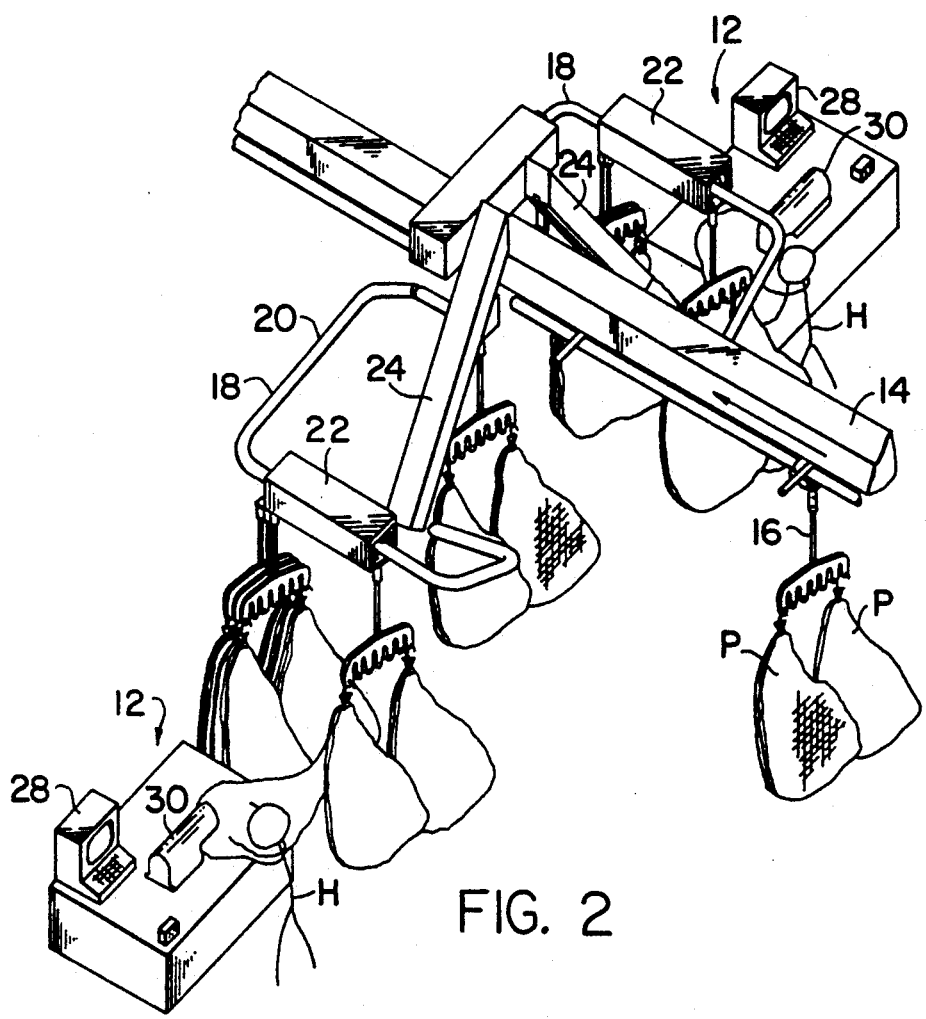
FIG. 2 is a perspective view of two work stations disposed at each side of a main rail and propulsion track in a conveyorized transport system used in the production system of FIG. 1.

As shown in FIG. 2, the main rail 14 supports a plurality of trolleys with suspended carriers or hangers 16 to which garment parts P or pre-cut pattern pieces are suspended. A conveyor chain with pushers (not shown) extends along the rail 14 and is driven by a motor (not shown) to advance the trolleys and garment parts P to various discharge and pick-up points at the work stations 12 distributed along the main loop of the system. At each work station, a subsidiary loop 18 allows selected trolleys along with the suspended parts P to be discharged from the main rail to the work station and to be returned to the main rail from the work station. The subsidiary loop includes the discharge rail 20, a stop and separator 22 and an elevator 24 for returning the trolley to the main rail 14. For further details concerning the construction of the mail rail, the subsidiary loops and associated mechanisms, reference may be had to U.S. Pat. Nos. 4,947,758 and 4,700,633.

As shown in FIG. 2, each work station includes equipment and a human operator H that performs certain work operations on the garment parts P that are delivered to the work station. Typically in a garment production system, the equipment may include a sewing machine 30 which the human operator employs to assemble one or more garment pieces. Specific work operations may include sewing a sleeve to a shirt panel, sewing a cuff to a sleeve, attaching patch pockets to a front panel of a shirt, attaching collars, sewing buttons, stitching and cutting button holes, hemming and any number of other operations that are needed to completely assemble and manufacture a garment. The work station operations may also include inspecting the product and recirculating the product back to a work station for any corrective action.

A work station 12 also generally includes a console 28 with keyboard so that the operator can receive instructions and view the orders which are in process at the work station. In addition the keyboard enables the operator to indicate when certain functions have been performed and to otherwise communicate with the rest of the production system.

In addition to each of the work stations which perform operations on the garment parts, the production system may include subsidiary loops 15 and 17 for loading carriers with garment parts to be assembled and for unloading garments at the completion of the manufacturing operation. The subsidiary loops 15 and 17 may also be used to temporarily store garment parts in the event that the work stations become overloaded.

The computerized controls for the production system 10 and peripheral equipment are illustrated generally in FIG. 1. Typically each of the work stations and in particular the consoles 28 at the work stations are connected to a loop control 40 which is a computer that monitors and directs the movement of the carriers and garment pieces between the plurality of work stations in accordance with commands received from a host computer 42. The host computer is connected to the loop control through a real time processor 44 and, as shown, the host computer preferably has one real time processor for each main loop of the production system 10. In one system, the host computer is a Unix System V, the real time processors are single board computers using a real time operating system such as VRTX and the loop control 40 is a single board computer using a 6809 microprocessor. The host computer may, if desired, be connected to a main frame computer 46 to receive product orders and transmit work completed, work in process and other types of information for billing, accounting and other purposes. An engineering terminal 48 may also be connected to the production system 10 through the host computer 42 to monitor operations for maintenance, design and other purposes. The host computer 44 is also typically connected to a supervisor terminal 50 which allows all of the operations to be monitored and controlled by the production supervisor. A printer 52 is typically connected to the system for printing status, maintenance and other reports.

Figure 3:
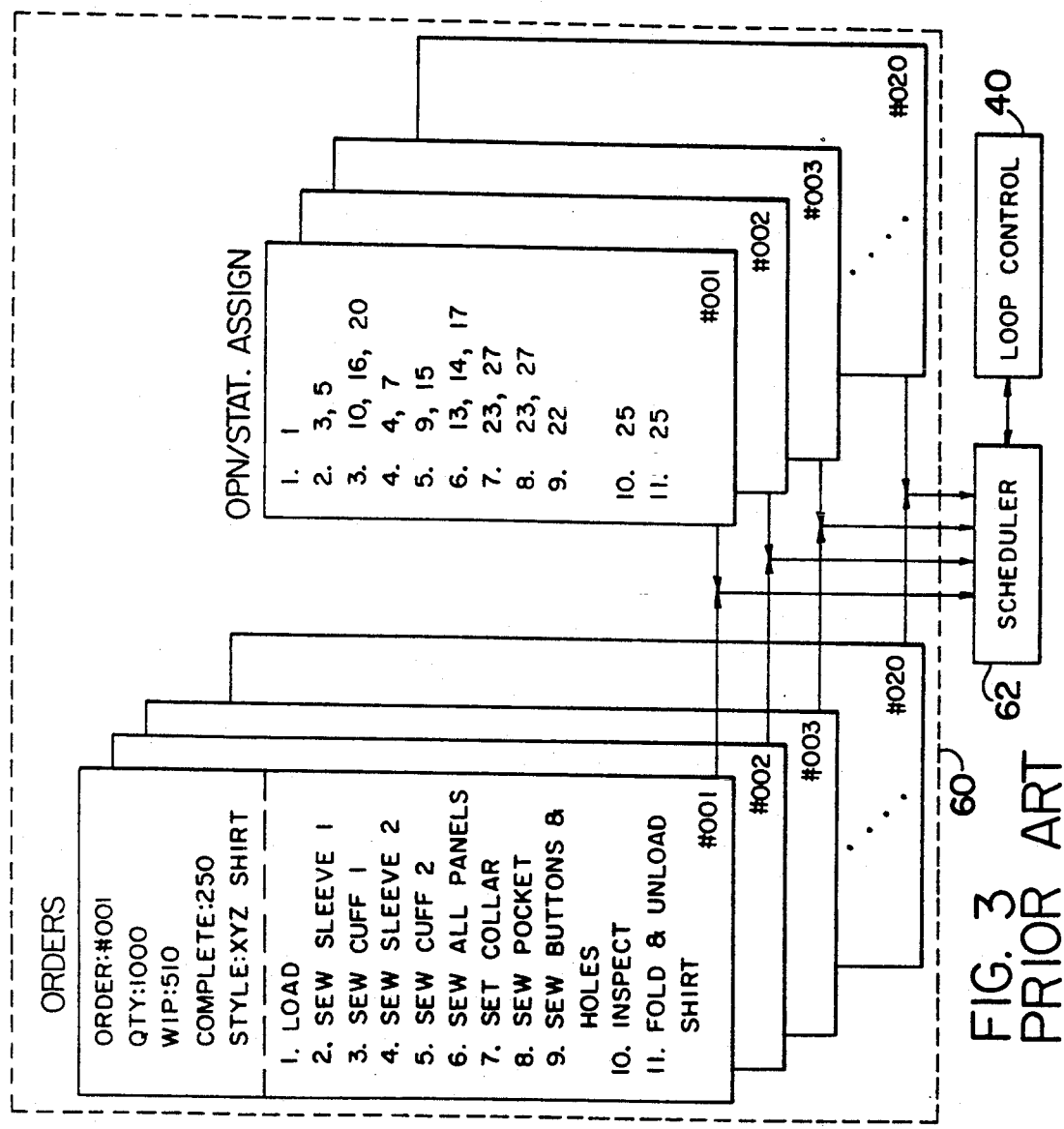
FIG. 3 is a diagram illustrating in schematic form the controls for scheduling the processing of product orders in accordance with the prior art.

The diagram in FIG. 3 illustrates schematically a portion of the prior art control that has been used until now to regulate the flow of work in the production systems. The control is capable of handling several different orders for garments simultaneously. By definition each order pertains to a garment of given type and style. For example, order #001 may be for 1,000 shirts of style XYZ. Order #002 may be for 500 pants of style ABC. Each order additionally comprises a series of steps or work operations that are to be performed at the different work stations of the production system 10 in order to produce a finished product such as a shirt or pants. The steps or work operations for each order are stored in one portion of a data memory 60 of the host computer 42 along with the work stations already assigned to perform each of the operations in the series. The operations are listed sequentially or with a sequence code so that they can be read from memory along with the sequence information by a scheduler 62 which in essence is a software subroutine within the real-time processor 44 of the host computer 42. The scheduler looks up the assigned work stations for each operation and determines which one of the work stations will be employed to perform the particular work operation under consideration. Sequencing to the next operation and looking up the assigned stations occur simultaneously since the data are stored together in the data memory 60. Thus, the partially assembled garment can be immediately directed to the next work station after the preceding operation has been completed.

The logic employed within the scheduler to determine which one of the assigned stations will be employed for a given work operation relies upon a number of factors. One of the primary factors is whether the work station at which the garment parts are currently located can perform the next operation. If the current station has the capability, then transfer to another station is not necessary. The current location of the garment parts is known by the scheduler from information received from the loop control 40. Other factors entering into the determination of the scheduler include the size of the backlog at the assigned stations, the skill of the machine operator at the work station, the colors of thread available at a station, and numerous other factors both economic and physical. Once the scheduler has decided which work station will receive the partially assembled garment, a command is sent to the loop control 40 and the control takes over the responsibility for signalling the work stations and operating the main rail and propulsion track 14 to accomplish the transfer.

It will be noted in FIG. 3 that a one-to-one correspondence exits between work operations and the station assignments for that order. This relationship is established at the time the order is generated and loaded into the data memory 60. Hence each order has a corresponding list of station assignments and all of this information must be stored in memory.

In the event that a malfunction exists at a particular assigned work station, or if, for example, an operator is not available at a particular work station, then each order and station assignment must be reviewed, and wherever the inoperative station appears, it must be deleted and a new station, if available, must be inserted. Substantial time reprogramming the station assignment lists is required in this instance, and substantial portions of the data memory 60 are occupied by the station assignment lists themselves.

Figure 4:
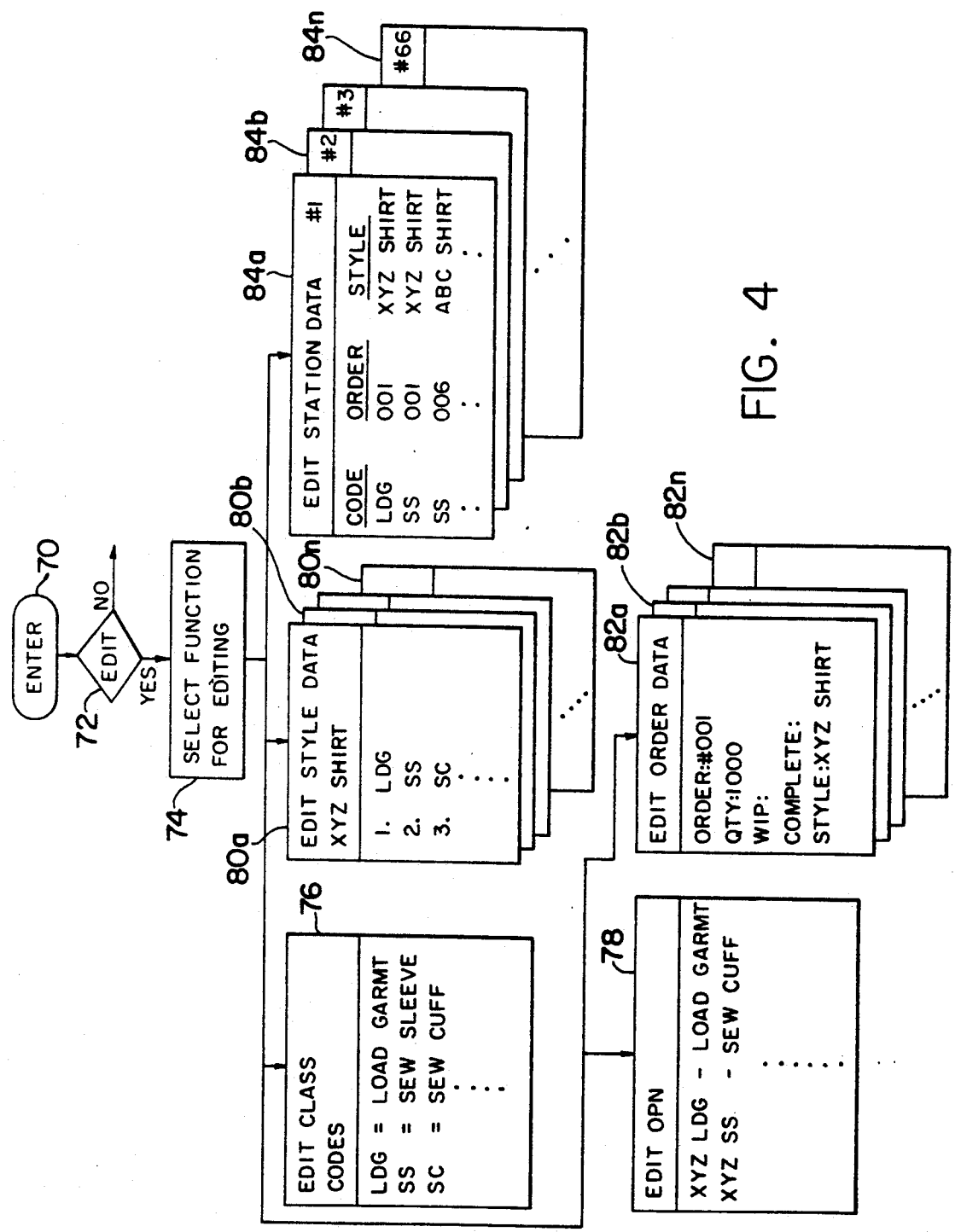
FIG. 4 is a flowchart showing the various edit functions in the software for the production of the present invention.
Figure 5:
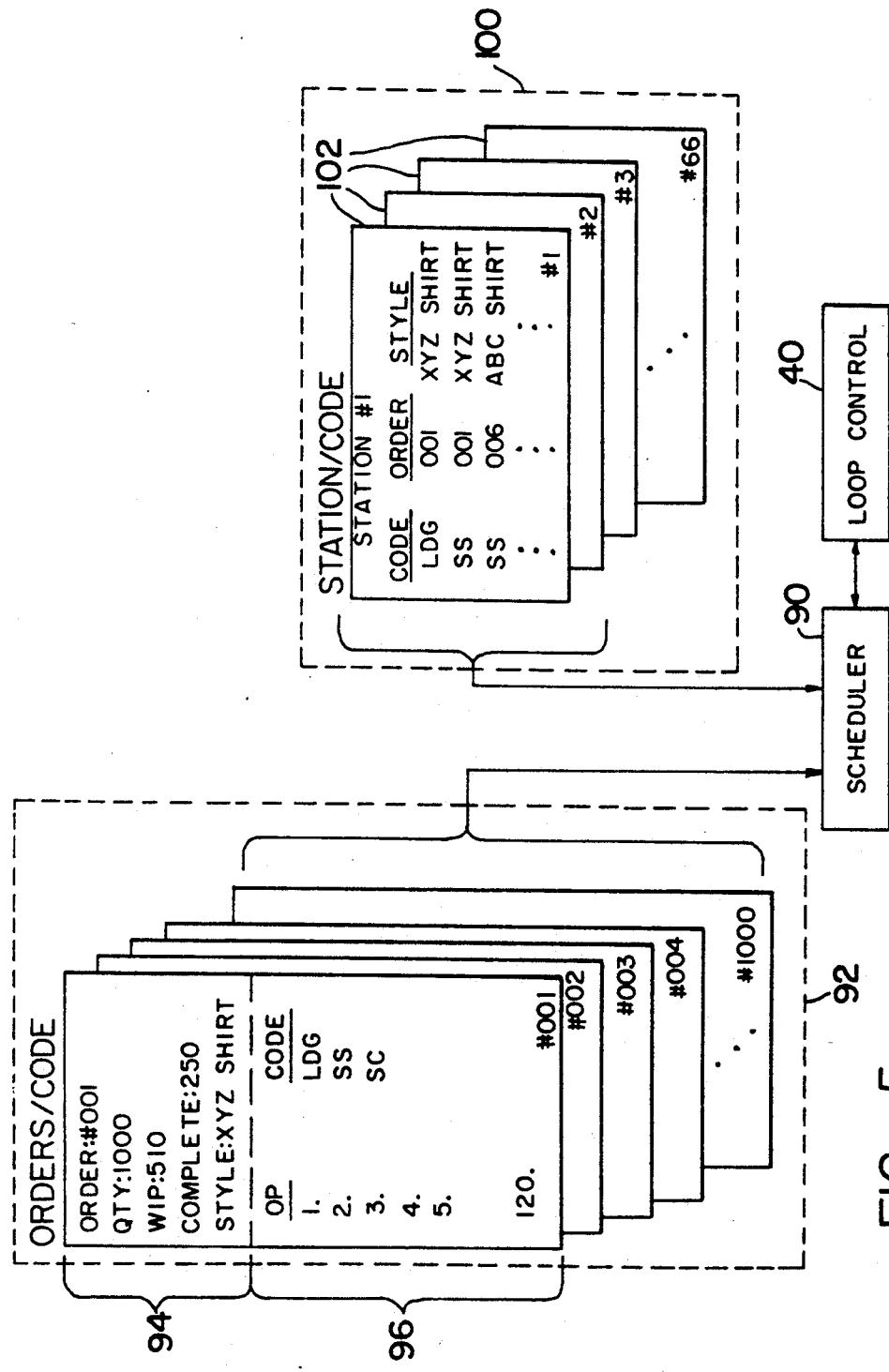
FIG. 5 is a diagram illustrating in schematic form the controls for scheduling the processing of product orders in accordance with the present invention.

FIGS. 4 and 5 illustrate the improved apparatus for regulating the flow of work in the production system 10 in accordance with the present invention. FIG. 4 is a flow chart illustrating the types of data that are entered and edited as needed to accommodate changes in the operations within the production system 10. Upon entering the program at 70, the operator is asked to decide if any particular piece of data is to be edited and if not, then the edit subroutine is by-passed at 72. If editing is needed, the program then advances to the SELECT FUNCTION at block 74 and the operator enters the particular edit function from a displayed menu. Each item which can be edited from the block 74 is illustrated in FIG. 4 and is discussed below seriatim.

A principal feature of the present invention is the assignment of class codes at edit block 76 to each general work operation that is available at the work stations 12 in the production system 10. For example, the code LDG (or a corresponding numeral code) is used to identify the function of loading the garment into the production system. The code SS identifies the function of sewing the sleeve to a shirt panel; the code SC identifies the function of sewing a cuff to a sleeve and so on. New codes can be added and old codes can be modified or deleted as part of the editing process. Once edited the codes are stored in the data memory of the host computer in conjunction with the full description of the codes for recall and display as needed.

The Edit Operation function illustrated at block 78 must be distinguished from the class codes established in block 76. The operation codes of block 78 are the codes utilized to identify each step or operation performed to produce a particular style of garment. The operation codes draw upon the general class code as indicated at block 78 to define the steps for manufacturing the XYZ shirt. All of the operations performed for each style of product must be defined for use by the editing subroutine as explained further below.

The Edit Style functions illustrated by blocks 80a, 80b, . . . 80n are utilized to compose the series of work operations that are employed to form any particular garment such as the XYZ shirt. Each style of garment has its own particular set of operations that are performed at the various work stations 12 to produce the product. In programming the computer for a particular garment, a sub-menu of the editing block 74 allows the style data blocks 80a, . . . 80n to be created, and each step or operation for producing the garment is then set forth in sequence and identified by one of the operation codes defined in block 78. A shirt, for example, may have a total of 15 operation codes while a men's suit jacket may have 90 different operations. As new styles of garments are created, new style blocks are generated and can be stored either in the data memory of the host computer or on disks or in other permanent memories that can be loaded into the host computer when an order for that style of garment is received.

An Edit Order function is illustrated by blocks 82a, 82b, . . . 82n for entering data pertaining to each order received for a style of garment. As indicated an order requires certain general information including an order number, the quantity of garments ordered and the style of the garment. The information pertaining to the order need only be stored temporarily while the order is in process and can be transferred at a later point in time to a more permanent hard copy form after the order has been filled. Part of the information that is updated during the course of filling the order is work in progress (WIP) and the number of products for the order that are COMPLETE.

Each order can be created or edited separately by a sub-menu in the selection block 74. By designating a particular order number, the data for that order can be called up at any time.

A still further edit function closely allied with the present invention is illustrated by the Edit Station blocks 84a, 84b, . . . 84n. Each edit station block lists and identifies the class codes corresponding to the work operations that are available at the designated station. For example, as indicated in box 84a, station #1 is capable of loading garment parts (LDG) to fill order #001 for XYZ shirts. The station can also perform the work operation for sewing a sleeve (SS) on the XYZ shirt for order #001 as well as sewing sleeves on the ABC shirt for order #006.

Each Edit Station block 84a–84n can be separately created or called up and edited by a sub-menu which appears when the edit station option is selected at block 74. It will be understood that the class codes entered or edited for station #1 are the only codes that define the functions available at the particular station, and the control apparatus for the production system 10 relies upon this data in determining which work station is selected for any particular work operation required by a garment order. Since there is one edit station block for each work station, the block 84n indicates that a total of 66 work stations are in the production system.

FIG. 5 illustrates the process by which the scheduler 90 of the present invention determines the work stations at which given work operations for product orders are performed. All data for the orders to be filled including the data defining the series of work operations for each order are stored in a first memory 92. The first memory 92 may in fact be a portion of the data memory within the host computer 42 or a dedicated memory within the real-time processor 44 for the production system 10. As indicated in FIG. 5, each order contains a header portion 94 and a main body portion 96. The header includes the order number, quantity, and style and in addition has data blocks reserved to indicate work in progress (WIP) and the number of products that have been completed (COMPLETE). The WIP and COMPLETE blocks are updated continuously as an order is filled so that the current status of an order can always be determined by reading the header portion 94. The header information is essentially the same information as that entered in the edit blocks 82a–82n in FIG. 4.

The body portion 96 contains the series of work operations listed in sequence in terms of the operation codes. The body portion for each order has memory space for as many as 120 different operations which is sufficient to accommodate even the most complex garments such as men's or women's dress suits. In one embodiment the first memory has a capacity sufficient to accommodate up to approximately 1,000 different orders which is more than most production systems can handle at any given time. Thus there is sufficient memory capacity to store orders for garments that are frequently demanded as well as made-to-order garments, that is, garments that are only manufactured after an order from a customer is received.

The ability to store large numbers of orders is one of the principal features of the present invention. Although the prior art systems of FIG. 3 could also have been made to accommodate larger orders, the difficulties involving the reprogramming of a large number of orders whenever a work station became inoperative or a work operation assignment was changed made a high capacity system impractical. As explained hereafter, the reprogramming problem with the present invention is circumvented by the use of the class codes to identify each work operation in an order and also to designate the assigned work operations or capabilities of the work stations.

As shown in FIG. 5, all work station assignments 102 are listed in a second memory 100 in terms of the class codes for the work operations assigned or available at that given work station. The second memory may actually be a separate portion of the data memory within the host computer 42 or the real-time processor 44. The work operations of which that station is capable may be further restricted beyond the level of the class code by including a specific order number and the style of garment for which that work station is suited. If other data such as the order or style is omitted, and the class code is the sole designator of the station capability, then the station is unrestricted and available to handle any order or style that requires the work operation defined by the listed class code. Other information besides order or style may also be specified to restrict the work operations that are performed at any given station. Naturally entries are made for each work station in the production system 10, and all of the work operations in the series of operations set forth in the orders 94 must appear in one or more of the lists of operations in the station assignments 102.

It should be understood that the representation of the data stored in the memories 92 and 100 is schematic and that in fact that data will appear as a series of windows only when called up on the display of the supervisor terminal 50, the engineering terminal 48 or a work station monitor 28. The data is actually stored by conventional storage techniques which correlates each operation code for a particular order with information defining the sequence in which the operations of the series are performed to fill an order for a garment. Similarly, the station assignments 102 would be stored by conventional storage techniques with the class code, order and style data correlated with each work station.

With the series of operations for each order listed in the memory 92 by class code and with the work operations assigned to each work station identified in the memory 100 by class code, the scheduler 90 reads the class codes of each order sequentially as the respective work operations are performed and then searches all of the class codes of the station assignments 10 to determine all of the work stations which are available to perform the next work operation in the series. Having established the available work stations, the scheduler then selects one of the available work stations to actually perform the work operation. The logic employed by the scheduler as in the prior art system may include additional criteria beyond the station capability such as the work skills of the human operator at that station, the backlog at a station, the thread colors available and other physical and economic factors.

As an example, if the first operation, load garment (LDG), for order #001 has been completed, the scheduler 90 reads operation #002, sew sleeve (SS), and then searches all of the station assignments to determine which stations are capable of performing the sew sleeve (SS) operation on the XYZ shirt. FIG. 5 indicates that at least station #1 has the capacity to perform the sew sleeve function on order #001 for an XYZ shirt and if station #1 is the only station capable of that function, the garment pieces would be moved to that station unless, of course, the earlier operation, namely load garment (LDG) had also been performed at the same station. The location of the garment at any given time is known to the scheduler through information received from the loop control 40. If stations #1, #6 and #12 all were capable of the SS operation in order #001 for XYZ shirt, then the scheduler determines which station among the three is best suited to perform the SS operation. When the situation warrants, the scheduler may send prodcuts to the stations 15 or 17 to temporarily store the product and allow a backlog at one or more assigned work stations to dissipate. The scheduler thereafter sends the product from storage to the assigned work station.

The remaining operations for each order are resolved by the scheduler 90 in a similar "read-and-search" process. The process is carried out repetitively and in each instance commands are transmitted to the loop control 40 to establish an orderly flow of work between the various work stations.

A principal advantage of the present invention is readily apparent from the data stored as illustrated in FIG. 5. If a particular work station is taken out of service for any particular reason, no reprogramming of the order data and class codes in memory 92 is required. Hence, the existence of a large number of orders does not create any reprogramming burden when the station assignments are required to be changed The only editing required is in the second memory 100 and consists of the reassignment of the class codes for the inoperative station to one or more of the other stations in the system if the class codes for the inoperative stations are not otherwise duplicated in the system. Such editing is readily accomplished by entering the edit subroutine in FIG. 4 and the edit station data blocks 84a–84n for the involved stations. For example, if the station #1 is inoperative, each of the class codes assigned to that station must be deleted and the deleted class codes and other order or style information must be entered into the data for other work stations which have been rendered capable of performing the reassigned operations. Once the reprogramming has been accomplished, the system is prepared to operate as before without participation of the inoperative work station.

While the present invention has been described in a preferred embodiment, it should be understood that numerous modifications and substitutions can be had without departing from the spirit of the invention. Although the invention has been described in the context of a garment production system, the principles are equally applicable to other mass production systems for products that are manufactured by a series of work operations performed at distributed work stations or locations. The production system may in addition to controlling the work flow include other features to measure worker performance, establish accounts and billing for the products made and provide management with a tool for monitoring the entire production process. The number of work operations in each order, the number of work stations in each system and the number of orders that can be processed at any given time may require different memory capacities for different product lines. The capacities stated above are simply exemplary of one garment production system and are not intended in any way to limit the application of the invention. Accordingly the present invention has been described in a preferred embodiment by way of illustration rather than limitation.

We claim:

1. A production system for garments or other products comprising:
   a plurality of work stations having operating means for performing a series or work operations in which parts of a garment or other product are progressively manufactured, each work station being capable of performing at least one operation in a series to manufacture one or more products;
   controlled transporting means connected with the plurality of work stations for conveying the product in various states of manufacture from station to station to perform the series of work operations in sequence;
   control means connected in controlling relationship with the transporting means and including first memory means for storing a product order in terms of the series of work operations for a selected style of product, each work operation in the series being associated with a class code unique to the operation;
   second memory means for storing data defining the work operations assigned to each of the various work stations in the system, the assigned operations at a given station being defined in terms of the class codes whereby a search of the second memory for a class code reveals the stations assigned to perform a selected work operation; and
   scheduling means for searching the class codes in second memory means to identify the work stations assigned to perform a given work operation in a series for a given product order, and then selecting from the work stations assigned, one work station for accomplishing the given work operation for the order.

2. A production system for garments or other products as defined in claim 1 wherein the controlled transporting means is connected with the scheduling means for conveying selected product from one work station to the next work station in response to the selections of the scheduling means.

3. A production system for garments or other products as defined in claim 1 wherein:

editing means are provided for editing the second memory means and changing the class codes and corresponding work operations assigned to the various work stations.

4. A production system for garments or other products as defined in claim 1 wherein:
editing means are provided for editing the first memory means and changing the class codes and corresponding work operations comprising a given product order.

5. A production system for garments or other products as defined in claim 1 wherein:
a storage station is included among the plurality of work stations for temporarily storing garments or other product between work operations; and
the controlled transporting means is also connected with the storage station for conveying product between a work station and the storage station.

6. A production system for garments or other products as defined in claim 1 wherein:
at least some of the work stations include equipment operated by a human operator to perform work operations on the product.

7. A production system for garments or other products as defined in claim 1 wherein:
some of the work stations are capable of performing work operations of a defined class code on only selected product orders; and
the second memory means stores, in addition to the class codes of operations assigned to the work stations, other information identifying selected product orders of which the work station is capable.

8. Apparatus for controlling a transport system which conveys garments or other products in various states of manufacture between a plurality of work stations at each of which there exists a capability of performing at least one of a series of work operations which collectively result in manufacture of the product, comprising:
first memory means for storing in terms of operation codes the series of work operations required to be performed to manufacture a given product;
second memory means for storing in terms of operation codes the work operations in association with the work stations capable of performing the respective operations; and
scheduling means connected with the first and second memory means for reading from the first memory means operation codes for the operations required to manufacture a product, for scanning the operation codes of the second memory means to locate work stations capable of performing the work operations required for manufacture and for selecting from among the located work stations the particular work stations to actually perform the work operations.

9. Apparatus for controlling a transporting system as defined in claim 8 wherein:
the first memory means stores the work operations with sequencing information defining the sequence in which the work operations are to be performed to manufacture a product; and
the scheduling means reads the first memory means and selects the particular work stations to actually perform the operations in the sequence defined by the sequencing information.

10. Apparatus for controlling a transporting system as defined in claim 9 wherein:

the sequencing information is defined by the sequence of the operation codes within the first memory means.

11. Apparatus for controlling a transport system as defined in claim 8 which conveys products between the plurality of the wok stations which perform work operations and between other stations which receive product from work stations or send product to work stations in the manufacture of product without performing work operations on the product, wherein the scheduling means also selects from among said other stations stations to receive or send product as the work loads at the work stations vary.

12. Apparatus for controlling a transport system as defined in claim 8 wherein:
the second memory means stores the operation codes and additional information pertaining to manufacture of a product and the capability of the work stations that perform work operations; and
the scheduling means scans the operation codes and the additional information to select the work stations to actually perform the work operations.

13. A method of controlling workflow in a production system having a plurality of work stations, each performing one or more work operations which operations result in manufacture of product from parts thereof comprising:
assigning class codes to each of a series of work operations required to be performed at the various work stations to manufacture a number of different products, each series of operations being associated respectively with one of the products;
storing the class codes of the series in a first memory for subsequent use in filling orders for the products;
storing in a second memory in association with each work station the class codes for the work operations available at each station;
reading from the first memory the series of class codes for work operations required to fill an order for a given product;
scanning the class codes in the second memory to determine from among all of the work stations the work stations available to perform the series of work operations required to fill the order for the given product; and then
scheduling the workflow between the available work stations as determined by the scanning to fill the order for the given product.

14. A method of controlling workflow in a production system as defined in claim 13 wherein:
the step of storing the class codes in the first memory includes storing the series of class codes for work operations required to fill an order for a given product in combination with a sequence in which the work operations are to be performed by the available work stations;
the step of reading includes reading the series of class codes from the first memory and the stored sequence; and
the step of scheduling includes scheduling workflow between work stations in accordance with the stored sequence.

15. A method of controlling workflow as defined in claim 14 wherein an additional step comprises:
performing the series of work operations in the stored sequence to fill the order for the given product.

16. A method of controlling workflow in a production system having a plurality of work stations as defined in claim 13 wherein:

the steps of scanning and scheduling are performed after each work operation to select the work station to perform the next work operation in the series.

17. A method of controlling workflow in a production system as defined in claim 13 wherein:

the step of storing in a second memory includes storing additional information pertaining to a capacity to accomplish the work operations at the work stations; and the step of scanning includes scanning the additional information pertaining to the capacity; and the step of scheduling includes selecting from among the available work stations a particular work station to fill the order based upon both the class cods and the additional information in the second memory.

18. A method of controlling workflow in a production system as defined in claim 13 further including the step of editing the class codes stored in the second memory to reflect changes in work operations available at the work stations.

19. A production system for garments or other products comprising:

a plurality of work stations having operating means for performing a series of work operations in which parts of a garment or other product are progressively manufactured, each work station being capable of performing at least one operation in the series to manufacture one or more products;

control means including first memory means for storing a product order in terms of the series of work operations for a selected style of product, each work operation in the series being stored with a class code unique to the operation;

second memory means for storing data defining the work operations available at each of the various work stations in the system, the available operations at a given station being defined in terms of the class codes whereby a search of the second memory for a class code reveals the stations available to perform a selected work operation; and scheduling means for searching the class codes in the second memory means to identify the work stations available to perform a given work operation in a series for a given product order, and then selecting from among the available work stations a particular work station for accomplishing the given work operation for the order.

20. A production system for garments and other products as defined in claim 19 wherein:

a controlled transporting means interconnects each of the work stations for conveying the parts of a garment or other product in various states of assembly between the stations; and the scheduling means is operatively connected with the controlled transporting means for conveying a part to a particular work station in accordance with the selection.

21. A production system as defined in claim 19 further including editing means for editing the second memory means and changing the class codes to indicate different work operations available at the work stations.

* * * * *

UNITED STATES PATENT AND TRADEMARK OFFICE
CERTIFICATE OF CORRECTION

PATENT NO. : 5,233,534
DATED : Aug. 3, 1993
INVENTOR(S) : Harold Osthus, Richard Howitt and Vernon Beausoleil It is certified that error appears in the above-identified patent and that said Letters Patent is hereby corrected as shown below:

Column 1:

Line 27, after the word "loaded" please insert --onto--;

In the Claims:

Claim 1:

Line 30, please delete "or" and substitute --of--.

Signed and Sealed this

Twenty-second Day of March, 1994

Attest:

BRUCE LEHMAN

Attesting Officer      Commissioner of Patents and Trademarks